US008172675B2

(12) United States Patent
Migos et al.

(10) Patent No.: US 8,172,675 B2
(45) Date of Patent: May 8, 2012

(54) PERSONALIZATION USING A HAND-PRESSURE SIGNATURE

(75) Inventors: Charles J. Migos, San Francisco, CA (US); David H. Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 12/413,126

(22) Filed: Mar. 27, 2009

(65) Prior Publication Data

US 2010/0248822 A1 Sep. 30, 2010

(51) Int. Cl.
*A63F 13/00* (2006.01)
(52) U.S. Cl. ............... 463/29; 463/30; 463/31; 463/32; 463/33; 463/34
(58) Field of Classification Search ............ 463/29
See application file for complete search history.

(56) References Cited

U.S. PATENT DOCUMENTS 7,155,034 B1 * 12/2006 Recce ...................... 382/115
7,532,895 B2 * 5/2009 Hrastar ..................... 455/456.1
2001/0008848 A1 * 7/2001 Armstrong ................. 463/37
2002/0019259 A1 * 2/2002 Armstrong ................. 463/36
2003/0045353 A1 * 3/2003 Paulsen et al. ............ 463/40
2004/0031180 A1 * 2/2004 Ivanov ..................... 42/70.11
2004/0102931 A1 * 5/2004 Ellis et al. ................ 702/188
2005/0164783 A1 * 7/2005 Paulsen et al. ............ 463/29
2006/0285725 A1 * 12/2006 Recce ...................... 382/115
2007/0220427 A1 * 9/2007 Briancon et al. .......... 715/700
2008/0227546 A1 * 9/2008 Roberts ..................... 463/38
2010/0287379 A1 * 11/2010 Wittmer et al. ........... 713/179

* cited by examiner

*Primary Examiner* — Fernando L Toledo
*Assistant Examiner* — Ankush Singal
(74) *Attorney, Agent, or Firm* — Vierra Magen Marcus & DeNiro LLP (57) ABSTRACT

A hand-held device having a body with a pressure-sensitive exterior surface. At least a portion of the pressure-sensitive exterior surface is designed to be grasped by a user's hand. The pressure-sensitive surface contains a plurality of pressure sensors operative to provide an output signal proportional to a pressure applied by the user's hands to the exterior surface of the hand-held device at the area the pressure sensor is located. The device also includes a memory for storing the output signals provided by the plurality of pressure sensors and a processor for comparing the output signals provided by the plurality of pressure sensors against stored pressure profile signatures for positively identifying the user.

20 Claims, 8 Drawing Sheets

PERSONALIZATION USING A HAND-PRESSURE SIGNATURE

BACKGROUND

Biometrics measures and analyzes a person's physiological or behavioral characteristics for identification and verification purposes. It associates an individual with a previously determined identity/identities based on certain physical attributes or actions taken by the person. Since many physiological or behavioral characteristics are distinctive to each person, biometric identifiers are inherently more reliable and more capable than password based techniques in differentiating between an authorized person and an imposter.

One type of biometric measurement is fingerprint recognition technology. Many devices today (e.g., laptop computer, computer keyboard, mobile phone, etc.) include fingerprint recognition technology. A user, by swiping or placing their finger on a fingerprint reader may, for example, log onto their computer without having to enter a username and password. A fingerprint reader may be located on the device itself (e.g., reader integrated into the device surface) or as a separate component (e.g., USB device).

SUMMARY

One aspect of the present technology is to construct a pressure profile signature that allows the technology to reliably determine the identity of the user holding the device. A device is provided with a pressure-sensitive body having a plurality of pressure sensors distributed over the pressure-sensitive body. Each pressure sensor is operative to provide an output signal proportional to a pressure applied by the user's hands to the pressure-sensitive body at the area at which the pressure sensor is located. The output signals create a pressure profile signature. A user may be requested to grasp the device several different times to record and store more than one signature. Each time the person grasps the device, the location of each sensor detecting pressure exerted by the person's hands on the device, and the amount of pressure applied on the sensor, is recorded and stored as a reference pressure profile signature. The pressure profile signatures are associated with a user identifier (e.g., username, email address, password, gamertag, etc.), which is specific to the device. When a user subsequently grasps the device, a pressure profile signature is obtained and compared against the stored reference signatures.

One aspect of the present technology is to provide personalized content to a user. The personalized content is based on the user's unique pressure profile signature. The identity of the person grasping the device is determined based on comparing an acquired pressure profile signature with reference signatures. Upon determining a match, a user identifier is obtained. Customizable features of the device may be associated with the user identifier. In the instance whereby the device is a game controller, the user identifier may comprise a gamertag. The gamertag may be associated with customizable features of the gaming service such as the user's friends list, social groups, customized skins for the user interface, and the like. Upon logging into the gaming service with the user's gamertag, the technology provides these features customized by the user via a video screen (e.g., displays customized skin, displays user's friends list, etc.).

One aspect of the present technology is to authenticate a user based on the user's unique pressure profile signature generated when the user is grasping the device. A device is provided with a pressure-sensitive body having a plurality of pressure sensors distributed over the pressure-sensitive body. Each pressure sensor is operative to provide an output signal proportional to a pressure applied by the user's hands to the pressure-sensitive body at the area at which the pressure sensor is located. The output signals are used to create a pressure profile signature. User information may be identified based on a favorable comparison of the acquired pressure profile signature with a stored pressure profile signature. In the example whereby the user information is a username and a password, the user may be automatically logged into a gaming service, an email service, and the like simply by grasping the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technology described herein identifies a user based on how the user grasps an interface device, and configures the device to be personalized for the identified user. In one embodiment, the device is a game controller. The identification of a user can be based on a pressure signature. Once identified, the technology automatically logs the user into a gaming service and presents the user's customized home page to the user. In another embodiment, the device is a mobile phone. Upon identifying the user holding the mobile phone, the technology unlocks the phone by providing the user's password and displays the user's default screen.

Figure 1:
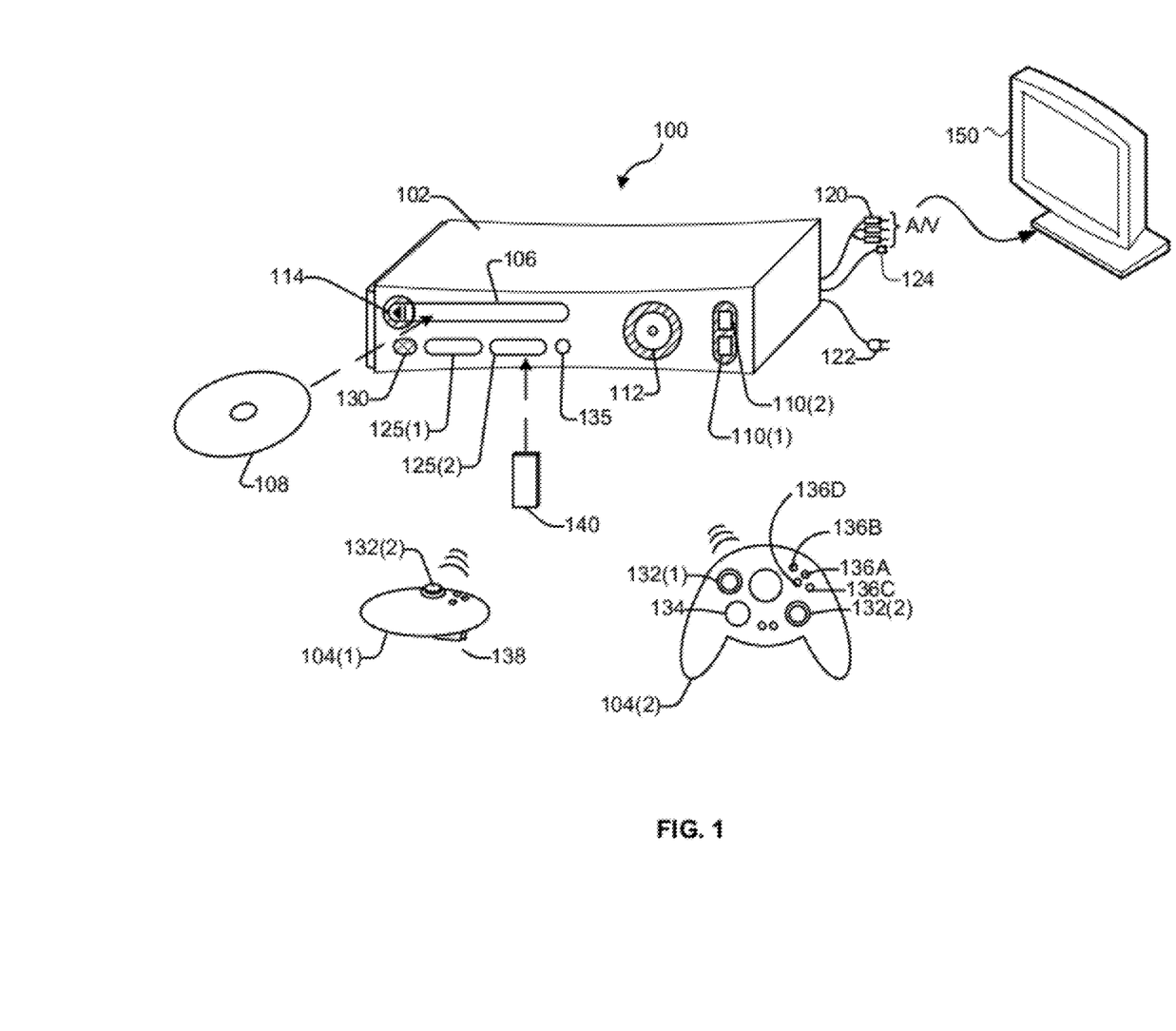
FIG. 1 is an isometric view of an exemplary gaming and media system for carrying out the present system.

The technology disclosed herein will now be described with reference to FIGS. 1-10. FIG. 1 shows an example of a computing device 102 configured as a dedicated game and media console (referred to as console 102 with respect to FIG. 1). In general, console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 wirelessly or via a USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers (not shown). These controllers are merely representative, and other known gaming controllers may be substituted for, or added to, those shown in FIG. 1.

During operation, console 102 is configured to receive input from controller 104 and display information on display 150. For example, console 102 can display a user interface on display 150 to allow a user to select a game using controller 104 and display achievement information as discussed below.

Figure 2:
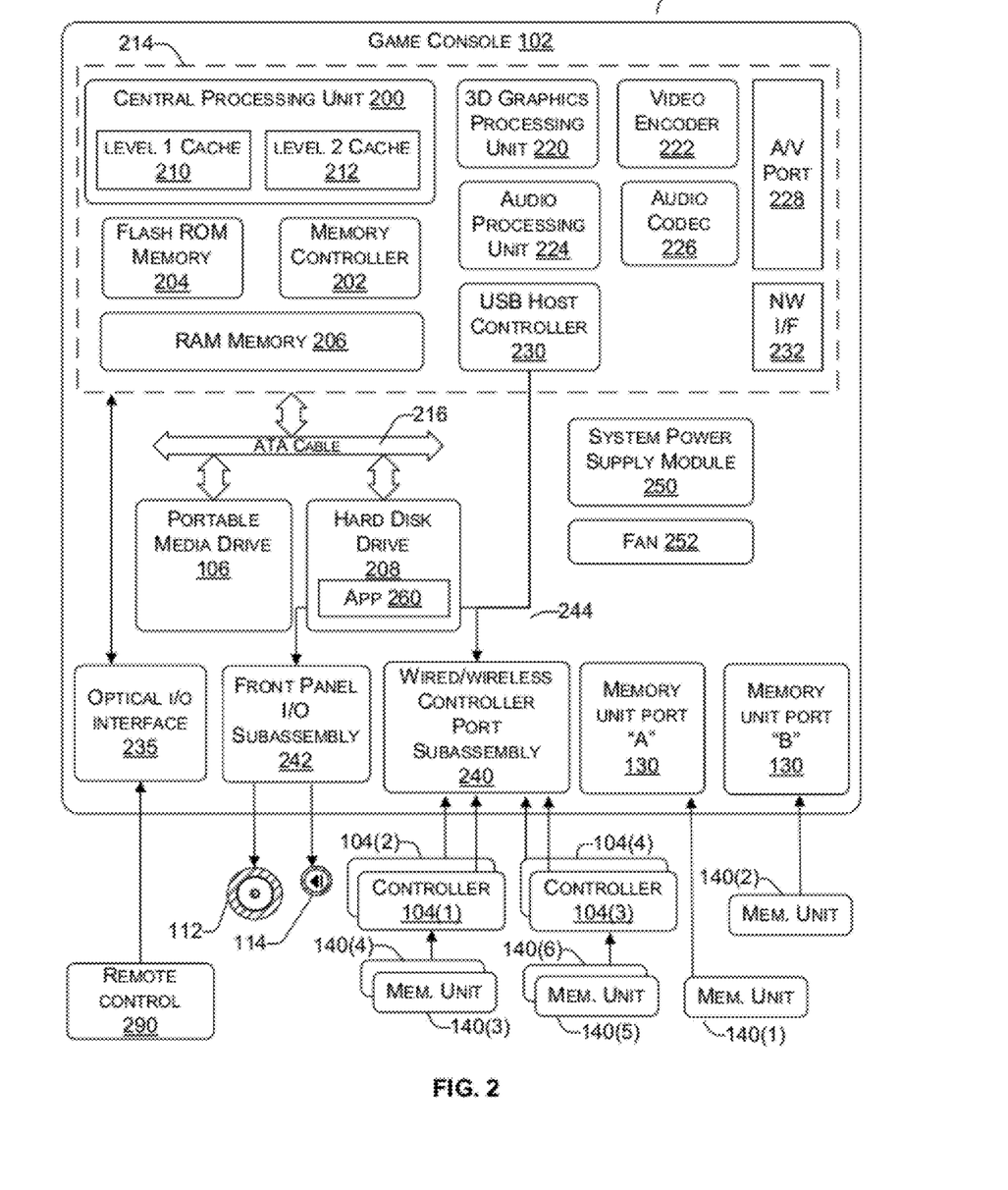
FIG. 2 is an exemplary functional block diagram of components of the gaming and media system shown in FIG. 1.

FIG. 2 is a functional block diagram of a computing device 102 showing the functional components in more detail. Computing device 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 206. In one implementation, CPU 200 includes a level 1 cache 210 and a level 2 cache 212, to temporarily store data and hence reduce the number of memory access cycles made to the hard disk drive 208, thereby improving processing speed and throughput.

CPU 200, memory controller 202, and various memory devices are interconnected via one or more buses (not shown). The buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral devices, such as the controllers 104(1)-104(2) of FIG. 1. Network interface 232 provides access to a network and may be any of a wide variety of various wired or wireless interface components including an Ethernet card, a modem, a wireless access card, a Bluetooth module, a cable modem, and the like.

In the implementation depicted in FIG. 1, computing device 102 includes a peripheral device controller interface 240 for interfacing with peripheral devices of the console of FIG. 1. The peripheral device controller interface 240 includes any hardware and software components needed to support wired and wireless operation with an external control device. A front panel I/O interface 242 supports the multiple functionalities of power button 112, eject button 114, as well as any LEDs (light emitting diodes) or other indicators exposed on the outer surface of computing device 102. Interfaces 240 and 242 are in communication with module 214 via one or more cable assemblies 244. The illustrated implementation also shows an optical I/O interface 235 that is configured to send and receive signals that can be communicated to module 214.

A system power supply module 250 provides power to the components of computing device 102. A fan 252 cools the circuitry within computing device 102.

An application 260 comprising machine instructions is stored on hard disk drive 208. When computing device 102 is powered on, various portions of application 260 are loaded into RAM 206, and/or caches 210 and 212, for execution on CPU 200, wherein application 260 is one such example. Various applications can be stored on hard disk drive 208 for execution on CPU 200. In embodiments where computing device 102 is a dedicated console, application 260 may be a game to be played via the console. In this example, when initiated, application 260 loads game instructions into CPU 200 that configure the CPU 200 to process game control data and render the game display. Where computing device 102 is a PC accessing online games from website 106, the game may not be stored locally on hard disk drive 208, but rather may be stored on website 106 and run via a web browser application on computing device 102.

Figure 3:
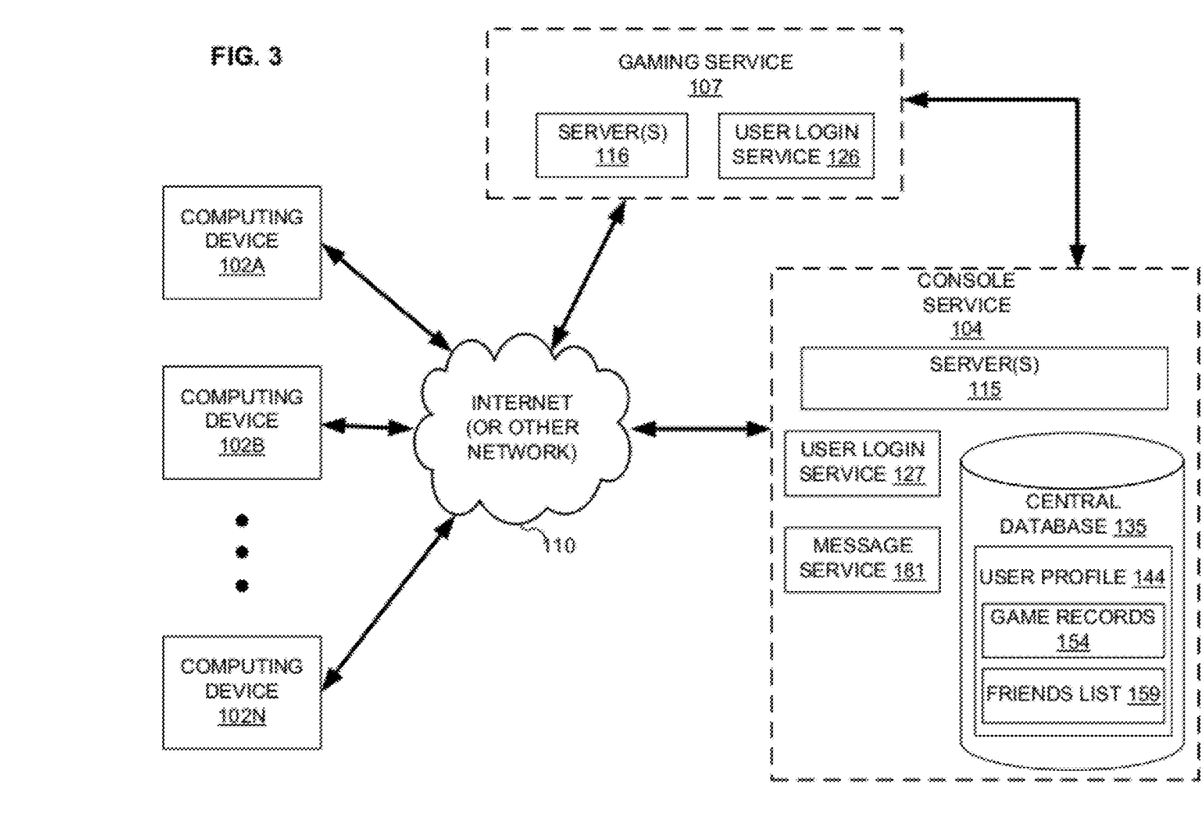
FIG. 3 is a block diagram of an exemplary operating environment.

FIG. 3 illustrates an exemplary operating environment. Console service 104 includes a login service 127, and gaming service 107 includes a login service 126. Login services 126, 127 are used to authenticate a user on computing devices 102 upon connection to one of console service 104 or gaming service 107. In accordance with the present system as explained below, both console service 104 and gaming service 107 use a common, central repository for storing authentication information so that a user may login to console service 104 and gaming service 107 using the same login credentials.

For example, when a user connects with service 107 and attempts to access games and/or his profile on gaming service 107, the login service 126 of service 107 prompts the user for a gamertag (a unique identifier associated with the user) and a password. The login service 126 may also obtain a computing device identifier that uniquely identifies the computing device 102 that the user is using and a network path to the service 107. As will be discussed in more detail later, the technology described herein allows a user to log into the login service 126 simply by holding or grasping the controller. The user is no longer required to manually enter his gamertag or password.

Upon receipt of a logon request in login service 126, a server 116 of service 107 contacts console service 104, either through a secure connection over network 110, or via a dedicated connection indicated by arrow 120. Console service 104 includes a central database 135 including user profile records 144. The gamertag and password received at service 107 in login service 126 are communicated to console service 104 and are then authenticated by comparing them to records in user profile records 144. Assuming proper authentication, the computing device identifier and the network path for the service 107 gaming session are stored in user profile records 144 so that messages and information may be sent to the computing device 102. Upon proper authentication, confirmation is also sent from console service 104 to login service 126 on service 107. Thereafter, the user may play the games hosted by gaming service 107, while having access to user profile data stored in user profile 144 on console service 104.

In the example described above, login to gaming service 107 may also result in the user being logged into console service 104. Thus, while a user is logged into service 107, data, messages and other communications may be sent to the user computing device 102 directly from console service 104. Alternatively, while a user is logged into service 107, data, messages and other communications may be sent from console service 104 to gaming service 107 and then in turn to the user computing device 102. In embodiments, upon login to gaming service 107, user profile records may be accessed from the central database 135 and buffered within a server 116 in gaming service 107 to speed communication between service 107 and computing device 102 relating to user profile data.

Instead of logging into service 107, a user may choose to login to console service 104. The login service 127 may also obtain a computing device identifier that uniquely identifies the computing device 102 that the user is using and a network path to the console service 104.

User profile records 144 in central database 135 store identification and descriptive information about the user such as for example the user's on-line identity, where a user lives, age, gender, etc. This information is available to a user upon login to either console service 104 or gaming service 107 as described above. User profile records 144 can also include additional information about the user such as game records 154 and friends list 159. Game records 154 include information for a user identified by a gamer tag and can include statistics for a particular game, rewards acquired for a particular game and/or other game specific information as desired.

Figure 4:
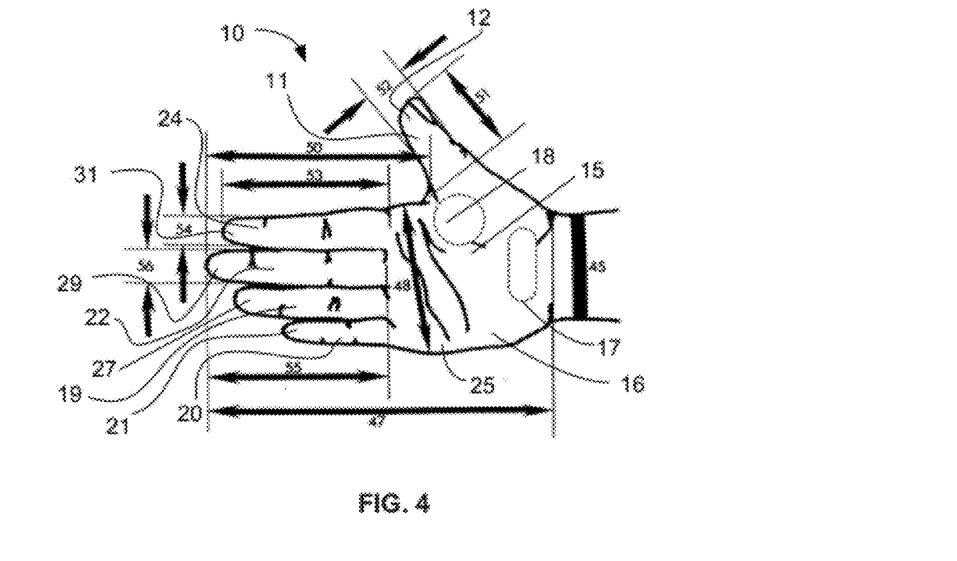
FIG. 4 is a plan view of a representative human hand.

FIG. 4 illustrates a person's hand 10. A person's hand has five fingers: a little-finger 20, a ring finger 19, a middle finger 22, an index finger 24, and a thumb 11. Different physical attributes of the hand 10 can be measured by hand length 47, hand breadth 48, thumb crotch-middle finger length 50, thumb length 51, thumb diameter 52, index finger length 53, index finger diameter 54, middle finger length 55, middle finger diameter 56, and the like.

FIG. 4 also shows certain areas of the hand 10. The area between the thumb 11 and the index finger 24 of the hand 10 is designated as area 18. The palm area 15 of the hand 10 near the thumb 11 is designated as area 15. The area of the palm 15 on the other edge of the hand 10 is shown as area 16. The base of the palm 15 (near the person's wrist) is designated as area 17. The purpose of designating these areas is to illustrate that these areas, while substantially uniform from person to person, have very different characteristics in regard to surface contour, length, width, and so on.

A person's hand contains several different muscles. These muscles differ from person to person and are pronounced in certain areas of the hand, such as palm area 15. If a person is active, the person's palm 15 may be more defined and may protrude a greater amount than area 18. While these characteristics are indicative of all people, the extent of the musculature of the hand as well as the extent of the depressions may vary greatly. In other words, two people with similar size hands will have different contours associated with the hand.

For example, there may be different depressions due to different muscle size and different variations of one person's hand as compared to another. Due to these many differences, the pressure profile of two identical size hands will be different. As will be explained in more detail later, the technology described herein allows a device to determine a person's identity based on how the person grasps the device (referred to herein as a person's "pressure profile signature").

This identification results in the differences between the contours of a person's hand, as well as the differences in the application of pressure applied by each unique hand configuration of each individual. Thus, when a different hand is placed on the device, a different pressure profile signature is obtained because the person's hand, when gripping the device, will touch and depress different pressure sensors in the various areas of the device.

Figure 5:
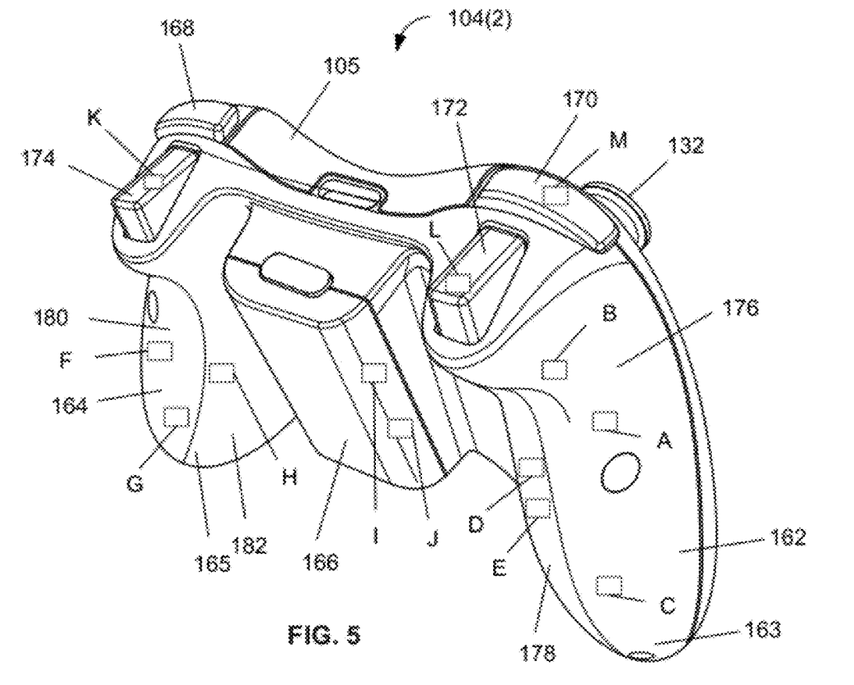
FIG. 5 is an isometric view of a game controller.

FIG. 5 illustrates an isometric view of a game controller 104(2). The game controller 104(2) includes, among other things, a body 105, a first grip 162, a second grip 164, a first trigger 172, a second trigger 174, a first bumper 170, and a second bumper 168. The body 105 generally includes most of the control devices on the controller (e.g., joystick, directional pad, buttons, etc.—not shown). The grippable area of the controller 104(2) is generally defined by the first grip 162, the second grip 164, the first bumper 170, the second bumper 168 and the face of the controller (not shown).

Each grip 162, 164 of the controller 104(2) defines more than one grippable surface. The first grip 162 includes an exterior surface 176 that contours into a bottom surface 178 and an interior surface (not shown). The second grip 164 includes an exterior surface (not shown) that contours into a bottom surface 180, and an interior surface 182.

A user may grasp the controller 104(2) in any configuration and on any surface. Thus, in one embodiment, the entire body 105 of the controller 104(2) is a pressure-sensitive surface. Alternatively, only selective areas of the controller are a pressure-sensitive surface. For example, it is within the scope of the technology for only the grips 162, 164, the bumpers 168, 170 and the face of the controller to have a pressure-sensitive surface. A reduced number of pressure sensors may still give an accurate assessment of the user's identification, while reducing cost. Regardless, a pressure-sensitive surface comprises numerous pressure sensors that are interconnected to provide a tactile pressure profile signature when a person's hands grasp the controller. In one embodiment, the pressure-sensitive surface contains resistive-touch technology sensors. In an alternative embodiment, the pressure-sensitive surface contains capacitive-touch technology sensors.

The number of pressure sensors contained in the pressure sensitive surface may vary. It is also understood that the number of pressure sensors in any given area of the pressure-sensitive material may vary. A user's hands grasping the controller 104(2) often will not make contact with a large area of the member 166 of the controller body 105 (see FIG. 6). Therefore, in one embodiment, the pressure-sensitive surface of the portion 166 does not contain as many pressure sensors as may be included in, for example, the first and second grips 162, 164, where it is likely that the user's hands will grasp the controller 104(2). In such areas as the grips 162, 164, the location and pressure applied by a user's hands could vary greatly depending upon the size of the user's hands, and athletic activity and the strength of the user. Thus, there may be fewer pressure sensors located near the distal ends 163, 165 of the grips 162, 164.

For discussion purposes only, FIG. 5 illustrates several pressure sensor areas of the controller 104(2). The limited number of sensor areas shown in FIG. 5 is not intended to limit the scope of the technology. FIG. 5 shows that the grip 162 includes multiple sensor areas on both the exterior surface 176 and bottom surface 178 of the grip 162. The exterior surface 176 includes sensor areas A, B and C, while the bottom surface 178 includes sensor areas D and E. These sensor areas are exemplary only, and are not intended to limit the number or placement of pressure sensors located on the grip 162. The grip 164 includes multiple sensor areas on both the bottom surface 180 and interior surface 182. The bottom surface 180 includes sensor areas F and G, while interior surface 182 includes sensor area H. The sensor areas shown on the grip 164 are exemplary only, and are not intended to limit the number or placement of pressure sensors located on the grip 164. The central body portion 166 shown in FIG. 5 includes sensor areas I and J; the first trigger 172 is shown including sensor area L; and the second trigger 174 is shown including sensor area K. The sensor areas shown on the two triggers 172, 174 and the central body portion 166 are for exemplary purposes only and are not intended to limit the number or placement of pressure sensors located in these areas of the controller. The bumper 170 is shown having sensor area M.

Figure 6:
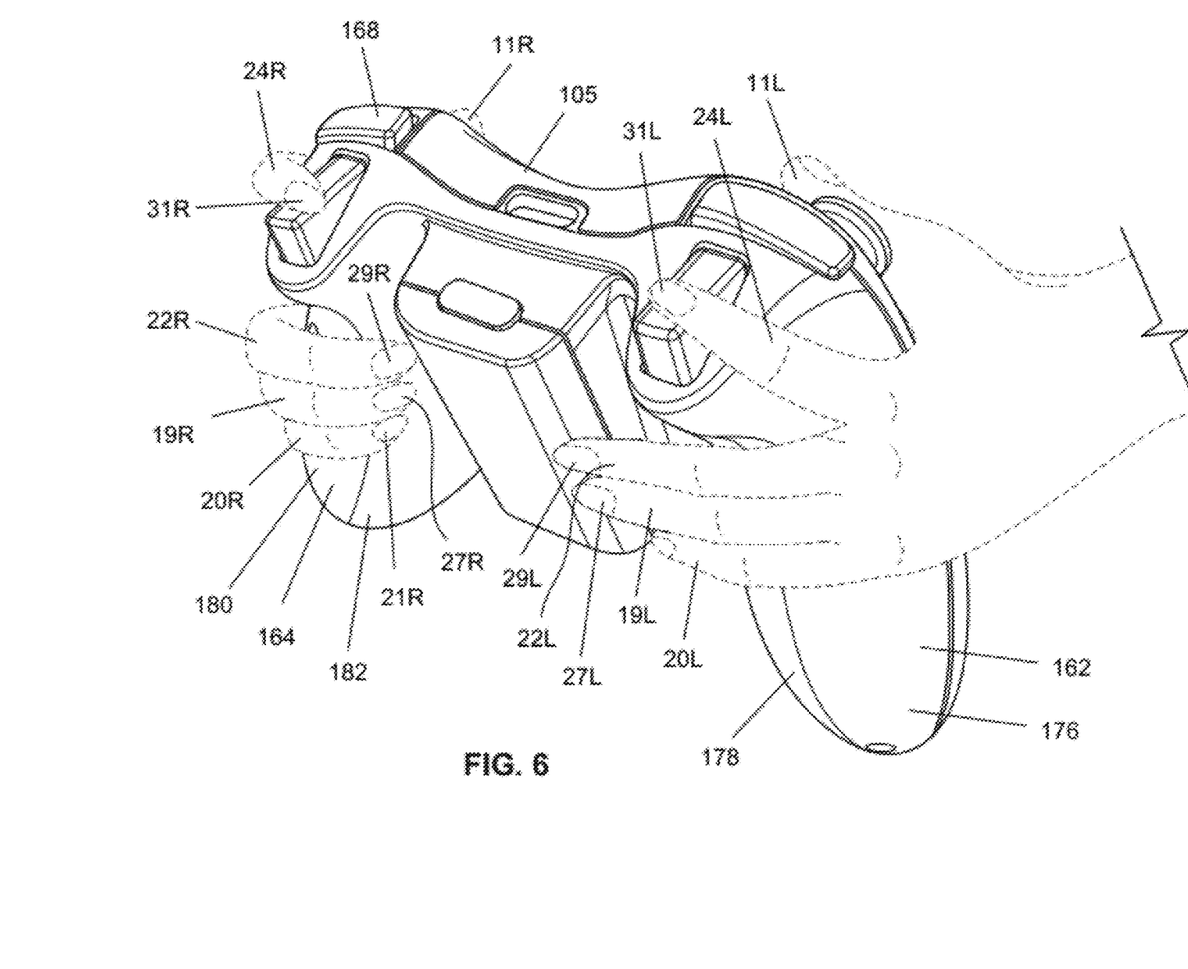
FIG. 6 is an isometric view of a user's hands grasping the game controller shown in FIG. 5.

FIG. 6 illustrates a person's hands gripping the game controller 104(2). The person's left hand is partially grasping the left grip 162 with their left pinkie finger 20L, ring finger 19L, middle finger 22L, and index finger 24L. The person's left thumb 11L is in contact with the face (not shown) of the controller. Grasping the controller in this manner with the left hand brings the person's palm 15 into contact with both the grip 162 and the face of the controller. The person's right hand is also grasping the right grip 164 with their pinkie finger 20R, ring finger 19R, middle finger 22R, and index finger 24R. The person's right thumb 11R is pressing against the face (not shown) of the controller. FIG. 6 shows that the tip 29R of the right middle finger 22R, the tip 27R of the right middle finger 19R and the tip 21R of the right pinkie finger 20R is in contact with the interior surface 182 of the grip 164 in a certain configuration. The tip 31R of the person's right index finger 24R is pressing against the right trigger 174.

Hand placement on the controller is affected by human hand geometry and human grasping behavior simultaneously. As discussed above, the diameter 54 and length 53 of a person's index finger 24, the diameter 56 and length 55 of a person's middle finger 22, and the breadth 48 of a person's hand differ. Thus, each user grasps and holds the controller in a unique configuration. In combination with the amount of pressure a person's hands exerts on the various areas of the controller, each person will generate a unique pressure profile signature.

When a user grasps and holds the controller in the manner shown in FIG. 6, a set of pressure readings is created. The set of pressure readings is referred to as a "pressure profile signature." As will be discussed in more detail later, a pressure profile signature is essentially made up from pressures measured by transducers distributed throughout the controller body. The output from each transducer may be collected and stored by the controller or a remote device.

Using the grip shown in FIG. 6, output will be received only from the sensors detecting pressure exerted against the controller by the user's hands. For example, output will be received from the pressure sensors located on the interior surface 182 and the bottom surface 180 of the grip 164 receiving contact from the person's pinkie finger 20R, ring finger 19R and middle finger 22R. Similarly, output will be received from the pressure sensors located on the exterior surface 176 and bottom surface 178 of the grip 162 receiving contact from the person's pinkie finger 20L, ring finger 19L and middle finger 22L. No output will be received from any pressure sensors located on the interior surface of grip 162 because none of the person's fingers are contacting that surface. At least one pressure sensor located in the trigger 172 and 174 will detect contact and pressure exerted by the person's index fingers 24R, 24L.

Changing the grip on the controller will generate a different pressure profile signature. Another person may grasp both grips 162, 164 similar to that shown by the person's right hand in FIG. 6 (completely wrapped around the grip). In this instance, pressure sensors on the interior surface 182 of the right grip 164 and pressure sensors on the interior surface of the left grip 162 will detect contact of the person's hand against the controller. As will be discussed in more detail later herein, each person may be asked to grasp, hold, release, and re-grasp the controller for a predetermined number of times to create several pressure signatures for each person.

The amount of pressure a person places on any given area of the controller is also detected. For example, a person with a larger palm area 18 will likely place more pressure on the controller where the person's palm area 18 contacts the controller. Similarly, the pinkie finger 20 of a person with a wider hand (as measured by distance 48 in FIG. 4) will grasp the grips 162, 164 further down the grip (towards the distal end 163, 165 respectively) than a person with a thinner or smaller hand. In this instance, more pressure sensors detect contact of the person's hand against the grips 162, 164, which will help distinguish the two users.

A person with long fingers may wrap their fingers further around the grips 162, 164 than a person with shorter fingers. Thus, output will be received from additional and different pressure sensors located in the grips 162, 164 and generate a different pressure signature than a person with shorter fingers. In other words, a pressure profile signature is determined largely on the physical attributes of the person's hands. Users also have their own style of holding a controller. For example, a user may chose to place their index fingers 24 on the bumpers 168, 170 and slide their hand up the grips 162, 164 so that their middle fingers 22 lay on the triggers 172, 174. This different grip on the controller will generate a different pressure profile signature than the grip shown in FIG. 6.

Figure 7:
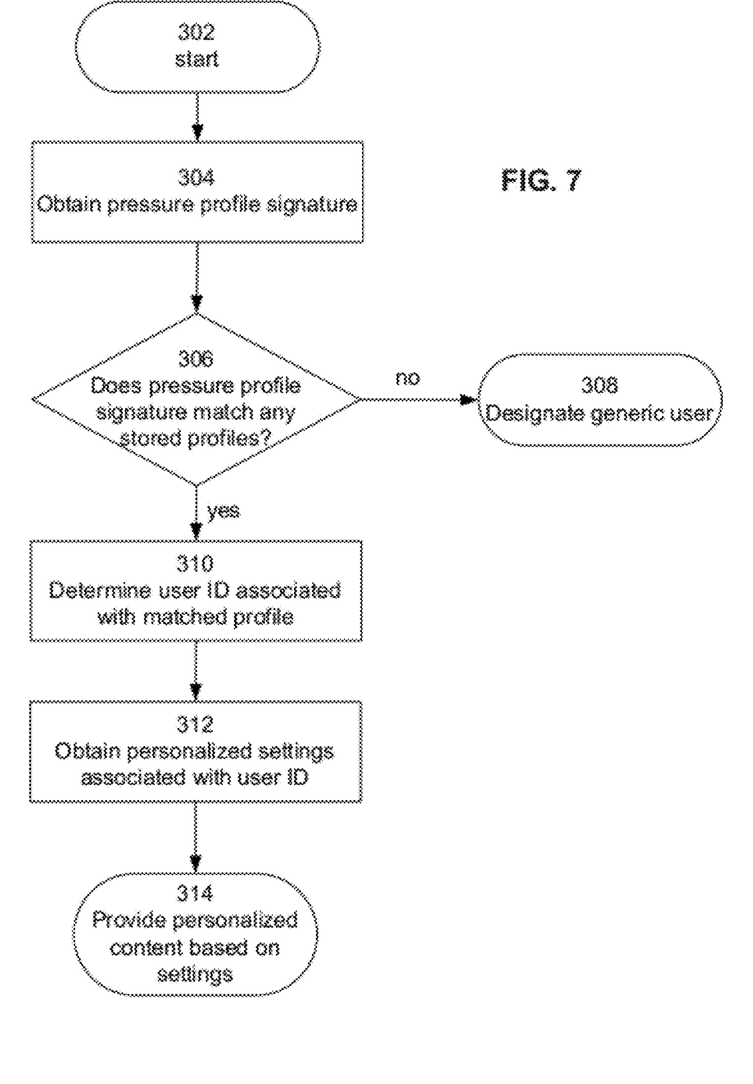
FIG. 7 is a flow diagram providing exemplary steps for personalizing content based on a pressure profile signature.

FIG. 7 illustrates exemplary steps for identifying a user based on a pressure profile signature and providing personalized content to the user based on their identity. At step 302, the technology determines to capture output from the pressure sensors. Additional detail of step 302 is provided later herein and described in more detail with respect to FIG. 10.

At step 304, a pressure profile signature is obtained. As discussed above, when the person's hands grasp the controller 104(2), their hands exert pressure against a plurality of sensors, which provide output. The output of each sensor and the location of each sensor is captured, creating a pressure profile signature.

At step 306, the technology compares the pressure profile signature obtained at step 304 against stored reference pressure profile signatures. Acceptance algorithms are known in the art today for determining whether or not stored values correlate with an actual measured value. In one embodiment, memory in the controller stores the reference pressure profile signatures. Alternatively, the reference pressure profile signatures may be stored in the game console 102. In yet another embodiment, the reference pressure profile signatures may be stored in a remote location (e.g., remote server, cloud, etc.). As will be discussed in more detail later, each reference pressure profile signature is associated with a particular user.

If there is no favorable match between the pressure profile signature obtained at step 304 and any of the reference pressure profile signatures, the technology designates the user currently holding the controller as a generic user, at step 308. In the instance of logging into a gaming service, the user may be presented with a sign-in page that requires the user to log in with a username (or gamertag) and a password. Alternatively, the user may still be automatically logged into the gaming service, but allowed to participate in the game only using default game settings.

If, however, a favorable match is determined at step 304, a user identification (ID) associated with the favorably matched reference pressure profile signature is identified, at step 310. In the instance of a game controller, a user identifier may comprise the user's gamertag. Other identifiers may be associated with a reference pressure profile signature.

At step 312, personalized settings associated with the user ID are obtained. In the instance of a game controller, the personalized settings associated with the user's gamertag may include, but are not limited to, identifying the user's avatar, any interface settings customized by the user (e.g., customized dashboard), friends list, and the like.

At step 314, the personalized content, based on the personalized settings obtained at step 312, is provided to the user. Using the gaming service example, the user is presented with their customized user interface, friends list, and the like via the screen 150. Thus, the user can log into the gaming service simply by grasping the controller. Signing into the gaming service no longer requires the user to manually enter a user ID and password to log into the gaming service.

Figure 8:
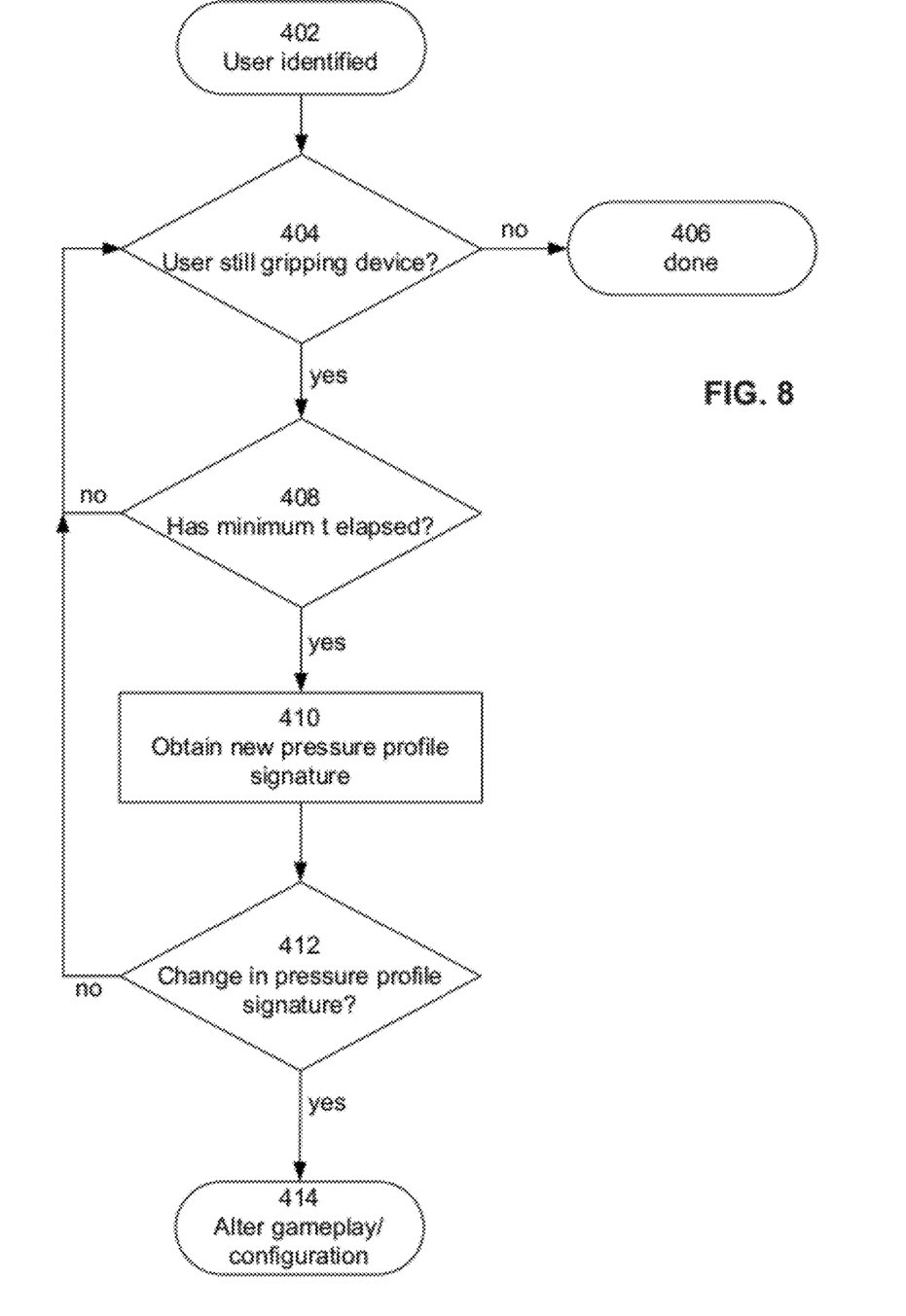
FIG. 8 depicts a flow diagram providing exemplary steps for modifying a game experience or altering the functionality of the device based on detecting a change of a pressure signature.

FIG. 8 illustrates exemplary steps for obtaining pressure profile signatures as the device is being used. At step 402, the user has been identified. As discussed above, the user has been identified by determining a favorable match with a stored pressure profile signature and associating the signature with a user identifier.

In order to enhance the gaming experience for a user and/or add functionality to the controller 104(2), the technology may periodically obtain a pressure profile signature while a user is playing a game. At step 404, the technology determines if the user identified in step 402 is still grasping the device. In one embodiment, the technology may determine that the controller is being grasped based on a minimum number of pressure sensors detecting pressure being exerted on the controller. Requiring a minimum number of sensors to detect pressure may prevent the technology from attempting to obtain a pressure profile signature when a user picks up the controller to, for example, store the controller away or simply move the controller to a new location on a desk. Alternatively, the technology may determine that the controller is being grasped based on a minimum number of sensors detecting pressure in specific areas of the controller. For example, the technology may require that a minimum number of sensors located in at least one grip detect pressure. These methods for determining whether a user is still grasping the controller are exemplary, and are not intended to limit the scope of the technology described herein.

If it is determined that the user is no longer grasping the controller, the technology does not try to further obtain any pressure profile signatures, at step 406. If, however, it is determined at step 404 that the user is grasping the controller, the technology determines if a minimum amount of time has lapsed since the last attempt to obtain a pressure profile signature, at step 408. The amount of time between obtaining pressure profile signatures may vary. If the minimum amount of time has not lapsed, the technology returns to step 404. If the minimum amount of time since the last pressure profile signature was obtained has lapsed, the technology proceeds to step 410.

At step 410, the technology obtains a new pressure profile signature. At step 412, the technology determines if the newly obtained pressure profile signature matches the previously obtained pressure profile signature. Because it is likely that the user slightly modifies their grip on the controller during the game, the newly acquired pressure profile signature is not required to be identical to the previously obtained pressure profile signature to be considered a match. If there is no change between the newly acquired pressure profile signature and the previously acquired signature, the technology returns to step 404. If there has been a change in the pressure profile signature, the technology proceeds to step 414.

At step 414, the technology may alter the game play based on the changed signature. Using the game controller example whereby the user is driving a car in a race car driving game, the technology may make the movement of the button 132 on the controller more sensitive if the signature change indicates that the user is grasping the controller tighter. Gripping the controller tighter may indicate that the user is nervous. By changing the sensitivity of the button on the controller, the user's driving may become more erratic, which is a common characteristic of a nervous driver.

In the event that the user grasps the controller in a completely different manner, the technology will identify a signature change and may alter the functionality of the controller itself. For example, using the controller example shown in FIG. 6, the user may release their left hand from the grip 162, rotate the grip 164 in their right hand, and point the grip 162 forward; pointing the controller 104(2) towards the screen 150 as if the controller were a gun. If the controller had a trigger on the interior surface 182 of the grip 164 (not shown), the technology, upon detecting the signature change, could deactivate the triggers 172 and 174 and activate the trigger on the interior surface 182 so that the user could user the controller as a gun. Other alterations in game play of the controller are within the scope of the technology described herein.

Figures 9, 10:
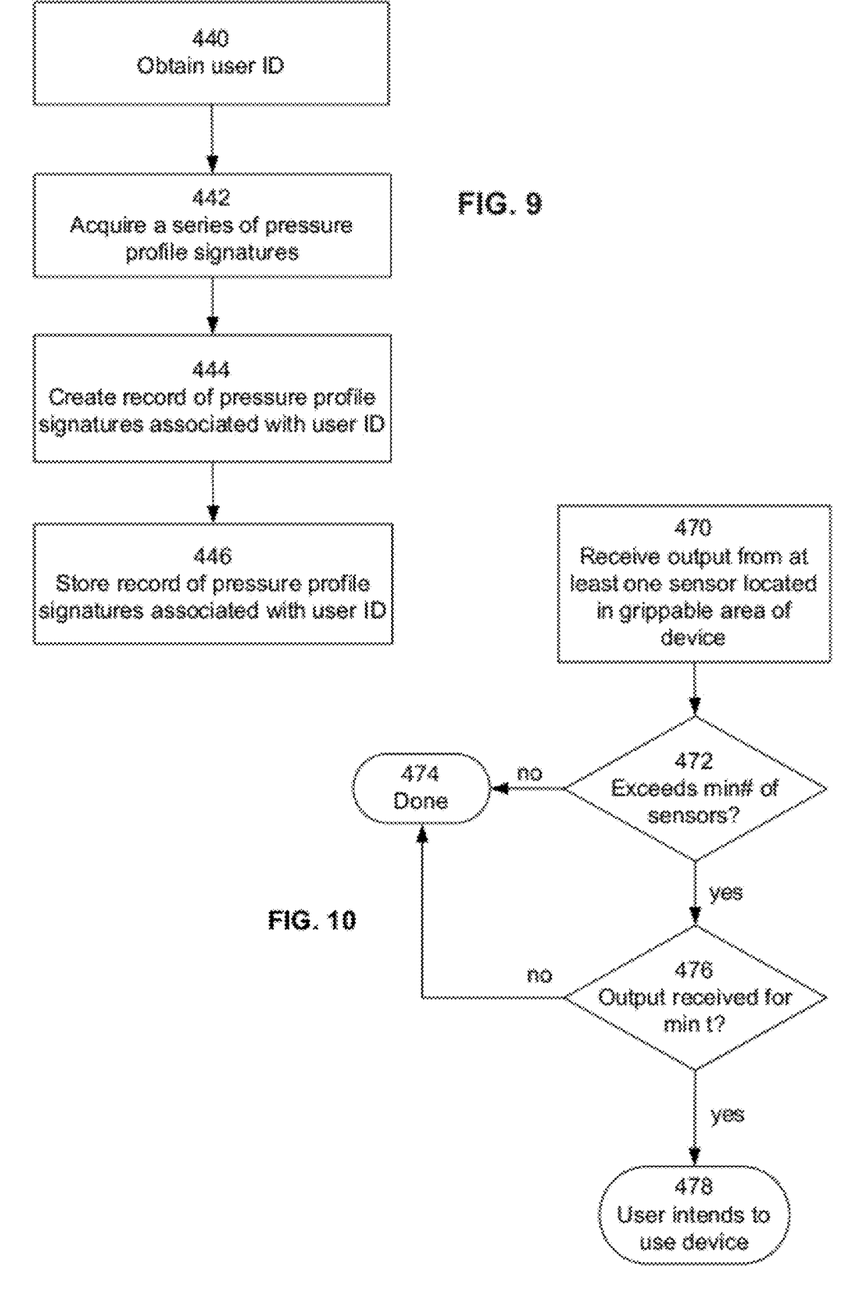
FIG. 9 depicts a flow diagram providing exemplary steps for generating reference pressure profile signatures associated with a user.
FIG. 10 depicts a flow diagram providing exemplary steps for determining if a user intends to use a device.

FIG. 9 illustrates exemplary steps for creating pressure profile signatures. As discussed above, each user must have a pressure profile signature implemented and stored in order to be recognized upon grasping the controller (also referred to as being "enrolled"). Thus, each user may be associated with at least one identifier (e.g., username, gamertag, password, etc.) specific to the device. This way the technology can be used to gain access to the device (e.g., mobile phone, laptop computer, etc.) or sign into a service (e.g., website, gaming service, etc.) based solely on a pressure profile signature.

To be enrolled, a user provides an identifier associated with the device the user is about register with. In the instance of a game controller, the user may provide their gamertag. At step 440, the technology receives an identifier. At step 442, the technology acquires a series of pressure profile signatures. To create each signature, the user grasps the controller and hand pressures will be induced throughout the pressure-sensitive surface of the controller. Using the examples provided in FIGS. 4-5, the entire profile of the pressure exerted by the user's hands against the controller is obtained and stored as a pressure profile signature. As discussed above, the pressure profile signature may be stored locally in the controller or remotely. It is unlikely that a user grasps the controller in exactly the same manner each time the user picks up the controller. Thus, during the enrollment process, the user may be asked to grasp the controller a second time. While the user is grasping the controller a second time, the entire hand profile is again taken and stored. It is within the scope of the technology to ask the user to grasp the controller more than two times. Therefore, a single user identifier may be associated with multiple pressure profile signatures, at step 446.

FIG. 10 illustrates exemplary steps for determining whether the user intends to use the device and therefore, a pressure profile signature should be obtained. At step 470, output from at least one pressure sensor is received based on pressure exerted by the user's hands on the controller. At step 472, the technology determines if the number of sensors detecting pressure exceeds a minimum number of sensors. It is within the scope of the technology to attempt to obtain a pressure profile signature upon a single pressure sensor detecting pressure. However, if a user is only, for example, partially grasping the end 163 of the grip 162 or only by two fingers, the technology will not be able to obtain a pressure profile signature based on this minimal amount of contact with the controller. If a minimum number of sensors do not detect pressure, the technology does not attempt to obtain a signature, at step 474.

If the technology determines that at least a minimum number of sensors detect pressure exerted against the controller, the technology determines if the output from the sensors has been received for a minimum time period, at step 476. If the output from the sensors is received for less than the minimum time period, the technology does not attempt to obtain a signature, at step 474. Requiring a minimum time period prevents the technology from attempting to obtain a signature when, for example, a user briefly picks up the controller to move it to another location close by. If a minimum number of sensors detect pressure exerted against the controller (step 472) and for a minimum period of time (step 476), the technology determines that the user is attempting to use the controller, at step 478.

The technology described herein is described primarily in context of a game controller. Other devices such as, but not limited to, mobile device, PDAs, smart phones, laptop computers, desktop computers, and the like are within the scope of the technology.

The subject matter of the present technology is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. In addition, it is assumed that one skilled in the art is familiar with details pertaining to television signal detection, and so such details are omitted herein for purposes of clarity.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims.

We claim:

1. A method for identifying a user based on how the user grips a device with at least one of their hands, comprising:
  receiving output signals from selective pressure sensors on a pressure-sensitive body of a device, the body having a plurality of pressure sensors distributed over the pressure-sensitive body, each pressure sensor is operative to provide an output signal proportional to a pressure applied by the user's hands to the pressure-sensitive body at the area at which the pressure sensor is located;
  determining that the user is attempting to use the device based on whether a number of pressure sensors detecting pressure exerted on the device exceeds a minimum number and whether the output signals have been received for at least a minimum time period;
  comparing the output signals received from the selective pressure sensors against stored pressure profile signatures responsive to said determination; and
  determining the identity of the user based on a favorable comparison of the received output signals with a stored pressure profile signature associated with the user.

2. The method as recited in claim 1, wherein the device is a game controller that interacts with a game console service, further comprising the step of:
  logging the user into the game console service using the user's identity.

3. The method as recited in claim 1, wherein the step of comparing the output signals received from the selective pressure sensors against stored pressure profile signatures comprises the steps of:
  generating a pressure profile signature based on the output signals received from the selective pressure sensors;
  accessing a database storing registered pressure profile signatures each associated with a user identifier; and
  comparing the generated pressure profile signature against registered pressure profile signatures stored in the database.

4. The method as recited in claim 1, further comprising the steps of:
- receiving a second set of output signals from selective pressure sensors responsive to a change in the pressure applied by the user's hands on the pressure-sensitive body of the device;
- comparing the second set of output signals received from the selective pressure sensors against stored pressure profile signatures; and
- determining the identity of the user based on a favorable comparison of the received second set of output signals with a stored pressure profile signature associated with the user.

5. The method as recited in claim 1, wherein the step of receiving output signals from selective pressure sensors responsive to the pressure applied by the user's hands on the pressure-sensitive body of the device comprises the step of:
- receiving output signals from pressure sensors responsive to the pressure applied by the user's hands based on the positioning of the user's fingers and palm on the device.

6. The method as recited in claim 3, wherein the step of determining the identity of the user comprises the steps of:
- identifying a favorable match between the generated pressure profile signature and a registered pressure profile signature stored in the database; and
- obtaining the user identifier associated with the registered pressure profile signature that favorably matched the generated pressure profile signature.

7. The method as recited in claim 3, wherein the step of determining the identity of the user comprises the step of:
- if a favorable match between the generated pressure profile signature and a registered pressure profile signature in the database cannot be identified, setting the identity of the user to a visiting user.

8. The method as recited in claim 3, wherein the step of determining the identity of the user comprises the step of:
- if a favorable match between the generated pressure profile signature and a registered pressure profile signature in the database cannot be identified,
  - (a) requesting a user to grasp the device with their hands;
  - (b) while the user is grasping the device, capturing output signals from selective pressure sensors responsive to the pressure applied by the user's fingers and palm on the pressure-sensitive body of the device;
  - (c) generating a pressure profile signature based on the captured output signals;
  - (d) storing the generated pressure profile signature with a user identifier associated with the user grasping the device; and
  - (e) repeating steps (a)-(d) until a predetermined number of pressure profile signatures are stored in association with the user.

9. The method as recited in claim 6, wherein the device interacts with a target device, further comprising the steps of:
- identifying personalized content for the target device associated with the obtained user identifier; and
- providing the personalized content to the user via the target device.

10. A hand-held device, comprising:
- a body with a pressure-sensitive exterior surface, whereby at least a portion of the pressure-sensitive exterior surface is designed to be grasped by a user's hand, the pressure-sensitive exterior surface having a plurality of pressure sensors with each pressure sensor operative to provide an output signal proportional to a pressure applied by the user's hand to the pressure-sensitive exterior surface of the hand-held device at the area the pressure sensor is located;
- a memory for storing the output signals provided by the plurality of pressure sensors and registered pressure profile signatures; and
- a processor for comparing the output signals provided by the plurality of pressure sensors against stored pressure profile signatures for positively identifying the user, said processor determines that the hand-held device is being grasped by the user based on a minimum number of pressure sensors detecting pressure exerted on the hand-held device.

11. The hand-held device as recited in claim 10, wherein the hand-held device comprises one of the following: a game controller, a remote control, a mobile phone, and a personal digital assistant.

12. The hand-held device as recited in claim 10, wherein the hand-held device interacts with a target device.

13. The hand-held device as recited in claim 10, wherein the plurality of pressure sensors are a plurality of capacitive touch technology sensors.

14. The hand-held device as recited in claim 10, wherein the plurality of pressure sensors are a plurality of resistive touch technology sensors.

15. The hand-held device as recited in claim 10, further comprising:
- a display for displaying content to the user;
- the processor able to identify at least one personalized content setting associated with the identified user, and provide content to the user via the display based on the at least one personalized content setting.

16. The hand-held device as recited in claim 12, wherein the processor provides personalized content to the target device based upon positively identifying the user.

17. A method for identifying a user, comprising:
- storing multiple pressure profile signatures associated with multiple users, each pressure profile signature associated with a user is based on a position of the user's hands grasping a device and the amount of pressure being applied to the device by the user's hands;
- determining that a first user is grasping the device;
- receiving a first set of output signals from selective pressure sensors responsive to the pressure applied by the first user's hands on a pressure-sensitive body of the device, the first set of output signals representing a first pressure profile;
- comparing the first pressure profile against the stored pressure profile signatures;
- determining the identity of the first user holding the device based on a favorable comparison of the first pressure profile with a stored pressure profile signature, said determining the identity of the first user comprises the steps of:
  - if a favorable match between the first pressure profile signature and a stored pressure profile signature cannot be identified,
    - (a) requesting the first user to grasp the device with their hands;
    - (b) while the first user is grasping the device, capturing output signals from selective pressure sensors responsive to the pressure applied by the first user's fingers and palm on the pressure-sensitive body of the device;
    - (c) generating a pressure profile signature based on the captured output signals;

(d) storing the generated pressure profile signature with a user identifier associated with the first user grasping the device; and (e) repeating steps (a)-(d) until a predetermined number of pressure profile signatures are stored in association with the first user;

receiving a second set of output signals from selective pressure sensors responsive to the pressure applied by the first user's hands on the pressure-sensitive body of the device, the second set of output signals representing a second pressure profile;

comparing the second pressure profile against the first pressure profile;

detecting a change in the pressure profile; and adjusting the functionality of the device based on detecting a change in the pressure profile.

18. The method as recited in claim 17, wherein the device comprises a game controller, the step of adjusting the functionality comprises the step of:

adjusting at least on function of the game controller.

19. The method as recited in claim 17, further comprising the step of:

configuring the device to be personalized for the identified user.

20. The method as recited in claim 17, wherein the step of storing multiple pressure profile signatures associated with multiple users comprises the steps of:

(f) requesting a user to grasp the device with their hands;

(g) while the user is grasping the device, capturing output signals from selective pressure sensors responsive to the pressure applied by the user's fingers and palm on the pressure-sensitive body of the device;

(h) generating a pressure profile signature based on the captured output signals;

(i) storing the generated pressure profile signature with a user identifier associated with the user grasping the device; and (j) repeating steps (f)-(i) until a predetermined number of pressure profile signatures are stored in association with the user.

* * * * *